(12) United States Patent
Lundquist et al.

(10) Patent No.: US 7,879,123 B2
(45) Date of Patent: Feb. 1, 2011

(54) INERTIAL SEPARATOR

(75) Inventors: Joseph Edward Lundquist, Oldsmar, FL (US); Allan Thomas, New Port Richey, FL (US)

(73) Assignee: Pall Corporation, Port Washington, NY (US)

( * ) Notice: Subject to any disclaimer, the term of this patent is extended or adjusted under 35 U.S.C. 154(b) by 356 days.

(21) Appl. No.: 12/236,614

(22) Filed: Sep. 24, 2008

(65) Prior Publication Data

US 2010/0275561 A1    Nov. 4, 2010

Related U.S. Application Data

(60) Provisional application No. 60/975,652, filed on Sep. 27, 2007.

(51) Int. Cl.
B01D 45/08    (2006.01)

(52) U.S. Cl. ............ 55/456; 55/435; 55/457; 55/347; 55/360; 55/346; 55/396; 55/394; 55/306; 55/340; 55/343; 55/DIG. 14; 96/381; 96/272; 95/269

(58) Field of Classification Search .......... 55/456, 55/435, 457, 347, 360, 346, 396, 394, 306, 55/340, 343, DIG. 14; 95/269; 96/381, 272
See application file for complete search history.

(56) References Cited

U.S. PATENT DOCUMENTS

| | | | | |
|---|---|---|---|---|
| 1,735,298 A * | 11/1929 | Pfeffer | ........................ | 55/343 |
| 2,323,707 A * | 7/1943 | Danz | ............................ | 55/347 |
| 2,662,610 A * | 12/1953 | Heinrich | ...................... | 55/347 |
| 2,765,918 A * | 10/1956 | Fontein et al. | ........... | 210/512.2 |
| 2,806,551 A * | 9/1957 | Heinrich | ........................ | 55/340 |
| 3,421,296 A * | 1/1969 | Beurer, Sr. | ................... | 55/306 |
| 3,448,563 A * | 6/1969 | Sobeck | ........................ | 55/347 |
| 3,469,566 A * | 9/1969 | Wilkinson et al. | ........... | 60/317 |
| 3,520,114 A * | 7/1970 | Gross et al. | ................... | 55/347 |
| 3,590,560 A | 7/1971 | Pall et al. | | |
| 3,611,679 A | 10/1971 | Pall | | |
| 3,713,280 A | 1/1973 | Keller et al. | | |
| 3,895,930 A * | 7/1975 | Campolong | ................... | 55/394 |
| 3,915,679 A | 10/1975 | Roach et al. | | |
| 4,008,059 A * | 2/1977 | Monson et al. | ............... | 55/396 |
| 4,050,913 A | 9/1977 | Roach | | |
| 4,162,906 A * | 7/1979 | Sullivan et al. | ............... | 55/346 |
| 4,242,115 A * | 12/1980 | Harold et al. | ................. | 55/347 |
| 4,255,174 A * | 3/1981 | Simpson | ...................... | 55/347 |
| 4,289,611 A * | 9/1981 | Brockmann | ................. | 209/710 |
| 4,482,365 A | 11/1984 | Roach | | |
| 4,643,158 A * | 2/1987 | Giannotti | ..................... | 123/591 |
| 4,746,340 A * | 5/1988 | Durre et al. | ................... | 55/347 |

(Continued)

FOREIGN PATENT DOCUMENTS

GB    1 207 028    9/1970

(Continued)

Primary Examiner—Jason M Greene
Assistant Examiner—Dung Bui
(74) Attorney, Agent, or Firm—Leydig, Voit & Mayer, Ltd.

(57) ABSTRACT

An inertial separator comprising a tubular body, the tubular body comprises a composition comprising a polymer selected from the group consisting of a cyclic olefin polymer and a cyclic olefin copolymer, and, a polyhedral oligomeric silsesquioxane and/or a flame retardant and/or an anti-static additive, is disclosed.

15 Claims, 7 Drawing Sheets

U.S. PATENT DOCUMENTS

| | | | |
|---|---|---|---|
| 4,971,603 A * | 11/1990 | Prinsloo et al. | 95/269 |
| 4,976,748 A | 12/1990 | Prinsloo et al. | |
| 4,985,058 A | 1/1991 | Prinsloo et al. | |
| 5,480,464 A * | 1/1996 | De Villiers et al. | 55/320 |
| 6,017,377 A | 1/2000 | Brown et al. | |
| 6,100,417 A | 8/2000 | Lichtenhan et al. | |
| 6,245,926 B1 | 6/2001 | Charrin et al. | |
| 6,362,279 B2 | 3/2002 | Lichtenhan et al. | |
| 6,630,234 B1 | 10/2003 | Tanisho et al. | |
| 6,759,460 B2 | 7/2004 | Kamo et al. | |
| 6,770,724 B1 | 8/2004 | Lichtenhan et al. | |
| 6,866,697 B2 | 3/2005 | Sammons et al. | |
| 6,884,273 B2 * | 4/2005 | Kopec et al. | 55/346 |
| 6,911,518 B2 | 6/2005 | Lichtenhan et al. | |
| 6,972,312 B1 | 12/2005 | Lichtenhan et al. | |
| 7,785,401 B2 * | 8/2010 | Wagner et al. | 95/272 |
| 2004/0106740 A1 | 6/2004 | Kanamori et al. | |
| 2005/0070665 A1 | 3/2005 | Ludlow, III | |
| 2005/0272611 A1 | 12/2005 | Lord et al. | |
| 2006/0041093 A1 | 2/2006 | Ravikiran et al. | |
| 2006/0073329 A1 | 4/2006 | Boyce et al. | |
| 2006/0188732 A1 | 8/2006 | Lichtenhan et al. | |

FOREIGN PATENT DOCUMENTS

| | | |
|---|---|---|
| GB | 2 324 484 | 10/1998 |
| JP | 10-316828 | 12/1998 |
| JP | 2006-111732 | 4/2006 |
| JP | 2006-124518 | 5/2006 |
| KR | 100 572 729 | 4/2006 |
| WO | WO 2005/016490 | 2/2005 |
| WO | WO 2005/044902 | 5/2005 |

* cited by examiner

INERTIAL SEPARATOR

CROSS-REFERENCE TO RELATED APPLICATIONS

This patent application claims the benefit of U.S. Provisional Patent Application No. 60/975,652, filed Sep. 27, 2007, which is incorporated by reference.

BACKGROUND OF THE INVENTION

Engines, whether gas turbine, gasoline, diesel, or hybrid, require a flow of air into the engine during operation. Some engines, particularly in aircraft, military, or high-performance vehicles, require an extremely high flow of air into the engine. Since particulates in the air can damage the engine, inertial separators (for example, vortex air cleaners, inlet particle separators (IPS), and engine air particle separators (EAPS)) are sometimes used with engines operating under conditions where the air may contain high volumes of particulates, to remove dirt from the air entering the engines. Inertial separators are particularly useful for use with aircraft, especially turbine driven aircraft (e.g., helicopters), as when close to the ground, they stir up great amounts of dirt and dust.

A plurality of inertial separators can be used with an engine, typically, each separator comprises a tubular body having a central passage with an inlet and an outlet at opposite ends, a deflector for creating a vortex stream in the influent air to concentrate contaminant particles in the air at the periphery of the passage and clean the air at the center of the passage, and an outlet member having a central clean air passage communicating with the central passage of the tubular body. The relatively clean air at the center of the passage passes through the central clean air passage of the outlet member. While some inertial separators operate with little or no scavenging, typically, the exterior wall of the outlet member defines a generally annular contaminant scavenge passage within the central passage of the tubular body, through which pass contaminant particles while relatively clean air at the center of the passage passes through the central clean air passage of the outlet member.

Some inertial separators have other applications, e.g., in industry, for example, to capture and/or separate particulates during woodworking, grinding, polishing, food processing, and painting.

However, inertial separators can be effective for undesirably short periods of time and/or expensive to produce and/or unable to withstand high operating temperatures.

BRIEF SUMMARY OF THE INVENTION

An embodiment of the invention provides an inertial separator comprising a tubular body or a generally tubular body, wherein the body comprises a composition comprising a polymer selected from the group consisting of a cyclic olefin polymer and a cyclic olefin copolymer, and, one or more of any of: a nano-structured chemical additive, a flame retardant, and an anti-static additive. In a preferred embodiment of the inertial separator, the composition comprises the polymer, a nano-structured chemical additive, and a flame retardant. Typically, at least one additional component of the inertial separator, preferably, at least the deflector, also comprises the composition.

In accordance with another embodiment of the invention, an inertial separator array is provided, comprising a housing, and two or more inertial separators, wherein at least one inertial separator is an inertial separator according to an embodiment of the invention.

Another embodiment of the invention provides a composition, the composition comprising a polymer and one or more of a nano-structured chemical additive, a flame retardant, and an anti-static additive, wherein the polymer is selected from the group consisting of a cyclic olefin polymer and a cyclic olefin copolymer.

BRIEF DESCRIPTION OF THE SEVERAL VIEWS OF THE DRAWING(S)

FIG. 2 shows views of the tubular housing and deflector of one of the embodiments of the inertial separator shown in FIG. 1.

FIG. 3 shows views of the outlet member of the embodiment of the inertial separator shown in FIG. 1.

DETAILED DESCRIPTION OF THE INVENTION

An embodiment of the invention provides an inertial separator comprising a tubular body or a generally tubular body, wherein the body comprises a composition comprising a polymer selected from the group consisting of a cyclic olefin polymer and a cyclic olefin copolymer, and: a nano-structured chemical additive and/or a flame retardant and/or an anti-static additive. In a preferred embodiment of the inertial separator, the composition comprises the polymer, a nano-structured chemical additive, and a flame retardant. Typically, at least one additional component of the inertial separator, preferably, at least the deflector, also comprises the composition.

An embodiment of the invention provides an inertial separator comprising a tubular body comprising a deflector mounted therein, and a generally coaxial outlet member, wherein the tubular body and the deflector comprise a composition comprising a polymer and a nano-structured chemical additive and/or a flame retardant and/or an anti-static additive, wherein the polymer is selected from the group consisting of a cyclic olefin polymer and a cyclic olefin copolymer. In one preferred embodiment of the inertial separator, the composition comprises the polymer, a nano-structured chemical additive and a flame retardant. In some embodiments of the inertial separator, the composition comprises the polymer, a nano-structured chemical additive, and an anti-static additive.

In a preferred embodiment, the tubular body, the deflector, and the outlet member, each comprise a composition comprising a polymer selected from the group consisting of a cyclic olefin polymer and a cyclic olefin copolymer, a nano-structured chemical additive, and a flame retardant.

In accordance with another embodiment of the invention, an inertial separator comprises (a) a tubular body having an inlet at one end, an outlet at the opposite end, and a central passage therebetween, the central passage having a peripheral portion and a central portion; (b) a deflector coaxially mounted in the passage, the deflector having a plurality of spaced centrally joined helical vanes abutting the wall of the passage, and positioned at an angle to the line of air flow from the inlet to the outlet, so as to create a vortex stream of influent air centrifugally concentrating contaminant particles in the air at the periphery of the passage, and leaving air at the center of the passage relatively free from contaminant particles; (c) a generally coaxial outlet member positioned within the outlet end of the tubular body, the outlet member having an inlet at one end, and an outlet at the opposite end, and a central passage therebetween for delivery of clean air from the central portion of the central passage of the tubular body, the inlet end of the outlet member being of lesser diameter than the central passage of the tubular body; wherein the tubular body and the deflector each comprise a composition comprising: a polymer selected from the group consisting of a cyclic olefin copolymer and a cyclic olefin polymer; and, a polyhedral oligomeric silsesquioxane and/or a flame retardant and/or an anti-static additive.

Another embodiment of the invention provides an inertial separator comprising a generally tubular body comprising a first end and a second end, an inlet, and first and second generally coaxial outlets, wherein the second end of the body comprises a tapered end comprising the second coaxial outlet, and the first end of the body further comprises the first coaxial outlet, and the tubular body comprises a composition comprising a polymer selected from the group consisting of a cyclic olefin polymer and a cyclic olefin copolymer, and a nano-structured chemical additive and/or a flame retardant and/or an anti-static additive. In some embodiments, the first end of the body comprises the inlet, and the separator further comprises a spinner vane mounted on the first coaxial outlet, preferably, wherein the spinner vane comprises a composition comprising a polymer and a nano-structured chemical additive and/or a flame retardant and/or an anti-static additive, wherein the polymer is selected from the group consisting of a cyclic olefin polymer and a cyclic olefin copolymer. In other embodiments, a side wall of the tubular body further comprises the inlet, preferably, wherein the side wall and inlet comprise a composition comprising a polymer and a nano-structured chemical additive and/or a flame retardant and/or an anti-static additive, wherein the polymer is selected from the group consisting of a cyclic olefin polymer and a cyclic olefin copolymer.

In another embodiment, an inertial separator comprises a generally tubular body comprising a first end and a second end, an inlet, and first and second generally coaxial outlets, wherein the second end of the body comprises a tapered end comprising the second coaxial outlet, and the first end of the body further comprises the first coaxial outlet, and, the tubular body comprises a composition comprising a polymer and a polyhedral oligomeric silsesquioxane and/or a flame retardant and/or an anti-static additive, wherein the polymer is selected from the group consisting of a cyclic olefin polymer and a cyclic olefin copolymer.

Another embodiment of the invention provides a composition, the composition comprising a polymer selected from the group consisting of a cyclic olefin polymer and a cyclic olefin copolymer, a nano-structured chemical additive and/or a flame retardant and/or an anti-static additive. For example, in one embodiment, the composition comprises the polymer, a nano-structured chemical additive, and a flame retardant; in another embodiment, the composition comprises the polymer, a nano-structured chemical additive, and an anti-static additive; and in another embodiment, the composition comprises the polymer, a nano-structured chemical additive, a flame retardant, and an anti-static additive.

Preferably, the nano-structured chemical additive is a polyhedral oligomeric silsesquioxane. In some embodiments of the inertial separator and the composition, the composition includes two or more polyhedral oligomeric silsesquioxanes.

The composition can comprise additional components such as, for example, at least one additional additive such as a viscosity modifier and/or a slip agent and/or an impact modifier and/or an antioxidant. For example, in one embodiment, the composition further comprises a mold release agent and an impact modifier.

Advantages of aspects of the invention include one or more of the following: reduced weight; reduced manufacturing cost (due to ease of manufacturing and/or less need for expensive components in the composition); increased resistance to particle abrasion; increased tensile strength and impact resistance, reduced pressure drop; increased maximum operating temperature, less need for fillers; reduced tendency for particulates and/or ice to stick to the inertial separator surfaces; cost-effective ultraviolet and ozone resistance and/or fire retardance; better hot forming characteristics for assembling, e.g., via injection molding; and reduced injection mold die wear.

The present invention provides for ameliorating at least some of the disadvantages of the prior art. These and other advantages of the present invention will be apparent from the description as set forth herein.

Each of the components of the invention will now be described in more detail below, wherein like components have like reference numbers.

Figure 1:
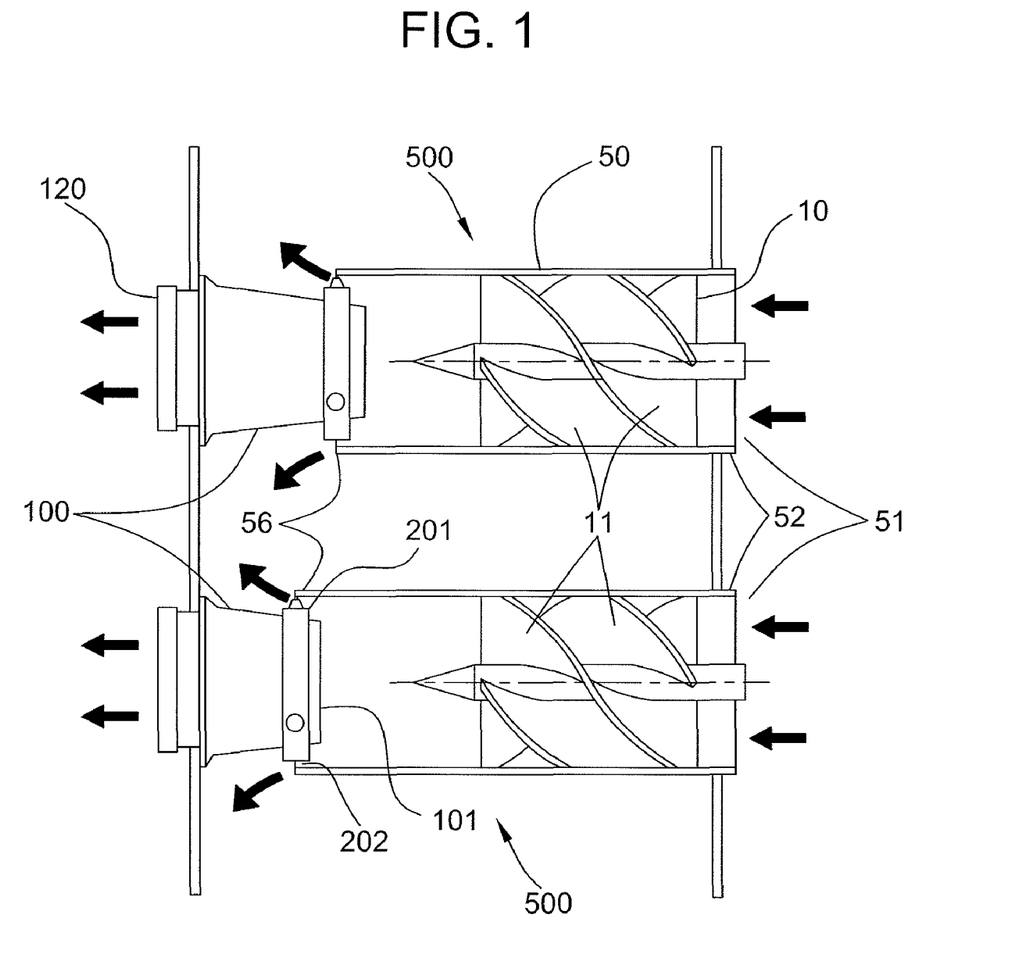
FIG. 1 is a partially cut-away view of two embodiments of an inertial separator according to the present invention, also showing air flow through the separators.

FIG. 1 shows two illustrative embodiments of an inertial separator 500 comprising a tubular housing 50 comprising an inlet 51 having an inlet end 52 and an outlet 55 having an outlet end 56 and an angularly vaned deflector 10, and an outlet member 100 comprising a first end 101 and a second end 120, wherein the outlet member 100 is disposed with the first end extending into the outlet end 56 of the tubular housing. The embodiments of the inertial separator 500 illustrated in FIG. 1 differ from one another with respect to the length of the outlet member 100. In some embodiments, e.g., as illustrated in FIG. 2, the inlet of the housing 50 further comprises an optional collar 53. In some applications, the collar may diverge particulates away from the separator.

In some embodiments, the tubular body is tapered for at least a portion of its length from the outlet to the inlet, such that the inner diameter of the outlet exceeds the inner diameter of the inlet. In other embodiments, the inner diameter is substantially constant from the inlet to the outlet. The angularly vaned deflector 10 is disposed within the tube in proximity to the inlet (shown in more detail in FIGS. 1 and 2A).

In those embodiments wherein the tubular housing has an outwardly tapered or flared portion, the taper or flare can be along the entire length of the housing, or downstream of the portion of the housing occupied by the vaned deflector. In those embodiments wherein the tubular housing is tapered or flared along the entire length, the vaned deflector is also tapered to match the taper of the tubular housing. In those embodiments including a taper, the angle is preferably in the range of from about 1 to about 5 degrees.

The tubular housing and vaned deflector comprise a composition comprising a polymer and a nano-structured chemical additive and/or a flame retardant and/or an anti-static additive, wherein the polymer is selected from the group consisting of a cyclic olefin polymer and a cyclic olefin copolymer. Preferably, at least one nano-structured chemical additive is a polyhedral oligomeric silsesquioxane, and in some embodiments, the composition includes at least two nano-structured chemical additives, wherein at least two nano-structured chemical additives are polyhedral oligomeric silsesquioxanes.

As described in more detail below, the composition can further comprise additional components, such as, for example, at least one additional additive, e.g., a slip agent and/or at least one additional polymer, e.g., an additional cyclic olefin copolymer. Alternatively, or additionally, the composition can comprise a viscosity modifier and/or an impact modifier and/or an antioxidant. In one embodiment, the composition further comprises a viscosity modifier comprising a polymer.

In one preferred embodiment, the composition comprises a polymer selected from the group consisting of a cyclic olefin polymer and a cyclic olefin copolymer, at least one nano-structured chemical additive wherein the chemical additive is a polyhedral oligomeric silsesquioxane, and, a flame retardant and/or an anti-static additive. In a more preferred embodiment, the composition further comprises a slip agent and/or an impact modifier.

The deflector is bonded in position at the inlet, typically, by injection molding (e.g., "one shot" molding), at the points where the vanes 11 abut the wall of the housing. The illustrated vanes are helical and are formed to a pitch length. The deflector can have any suitable length, in a typical embodiment, the vanes occupy in the range of from about 20% to about 70% of the length of the housing. In the embodiment illustrated in FIGS. 2A and 2B, the deflector has a cylindrical hub 12 which extends beyond the vanes on the upstream side thereof to form a blunt tip 13, and extends on the downstream side to form a conical tip 14, e.g., formed to a cone angle in the range of from about 30° to about 60°. Other shapes for either of the tips are encompassed by the invention, for example, the upstream tip can have a dome-like shape.

A generally tapered (e.g., having a frustoconical shape) tubular outlet member 100 comprising a first end 101 and a second end 120 is disposed with the first end extending into the outlet end 56 of the tubular housing. As shown in more detail in FIG. 3A, the outlet member 100 has a central open passage 150 therethrough for the removal of clean air, and, as shown in more detail in FIG. 1, the outlet member defines an annular space 201 between the tubular housing 50 at the periphery of the tube for the removal of contaminant particles, e.g., dirt.

The outlet member can be supported in position by, for example, tabs, e.g., formed on the outlet member and extending into the outlet end of the tubular housing, or by a back plate, e.g., as shown in FIG. 1.

Figure 3A:
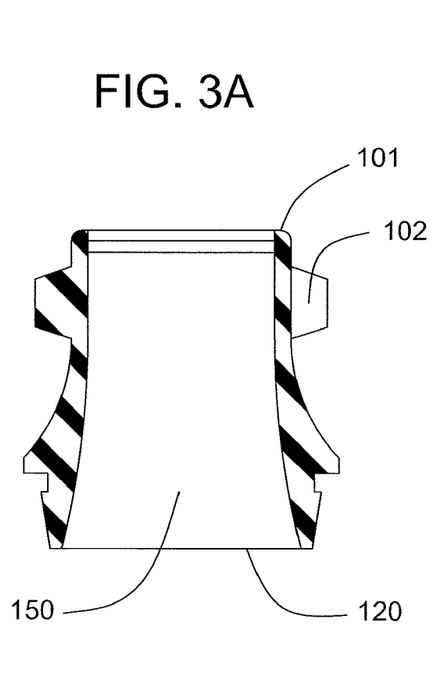
FIG. 3A is a cross-sectional view.
Figure 3B:
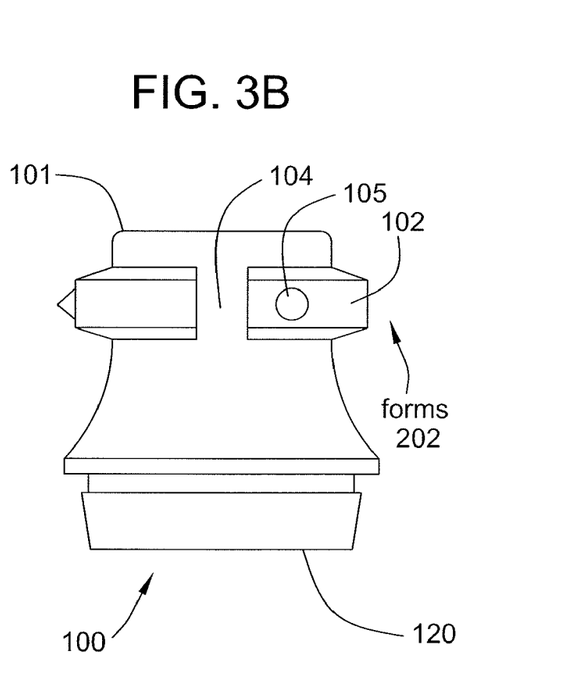
FIG. 3B is a perspective view.

In the embodiment illustrated in FIGS. 3A and 3B, the outlet member includes a peripheral or circumferential ring 102 attached to the member near the inlet end. Typically, the ring constitutes a flow restrictor and reduces the diameter of the annular passage of the tubular housing at the ring to an annular orifice 202 (shown formed in FIG. 1). The ring can restrict flow through the annular passage to ensure that the pressure in the central passage 150 is higher than in the scavenge chamber 250 therebeyond. The embodiment illustrated in FIG. 3B also shows a cutout 104 in the ring, and projections 105, illustrated as knobs on the ring. The use of a cutout can be useful in allowing larger particles to pass therethrough. The surface of the projections facing away from the ring can contact the inner surface of the tubular housing, e.g., for supporting the outlet member in position within the tubular housing.

The first end 101 of the outlet member facing the deflector preferably defines a thin annulus that sharply separates clean core flow in the passage 150 from contaminant-laden peripheral flow. The end can include a lip, e.g., a conically shaped lip, on the end of the outlet member that is within the tubular housing. The lip, if present, can, for example, form a baffle to direct contaminants, e.g., dirt particles, to the periphery of the tubular housing for discharge.

The outlet member can comprise a variety of materials, preferably, however, it comprises the same composition as the tubular housing and vaned deflector.

Figure 6:
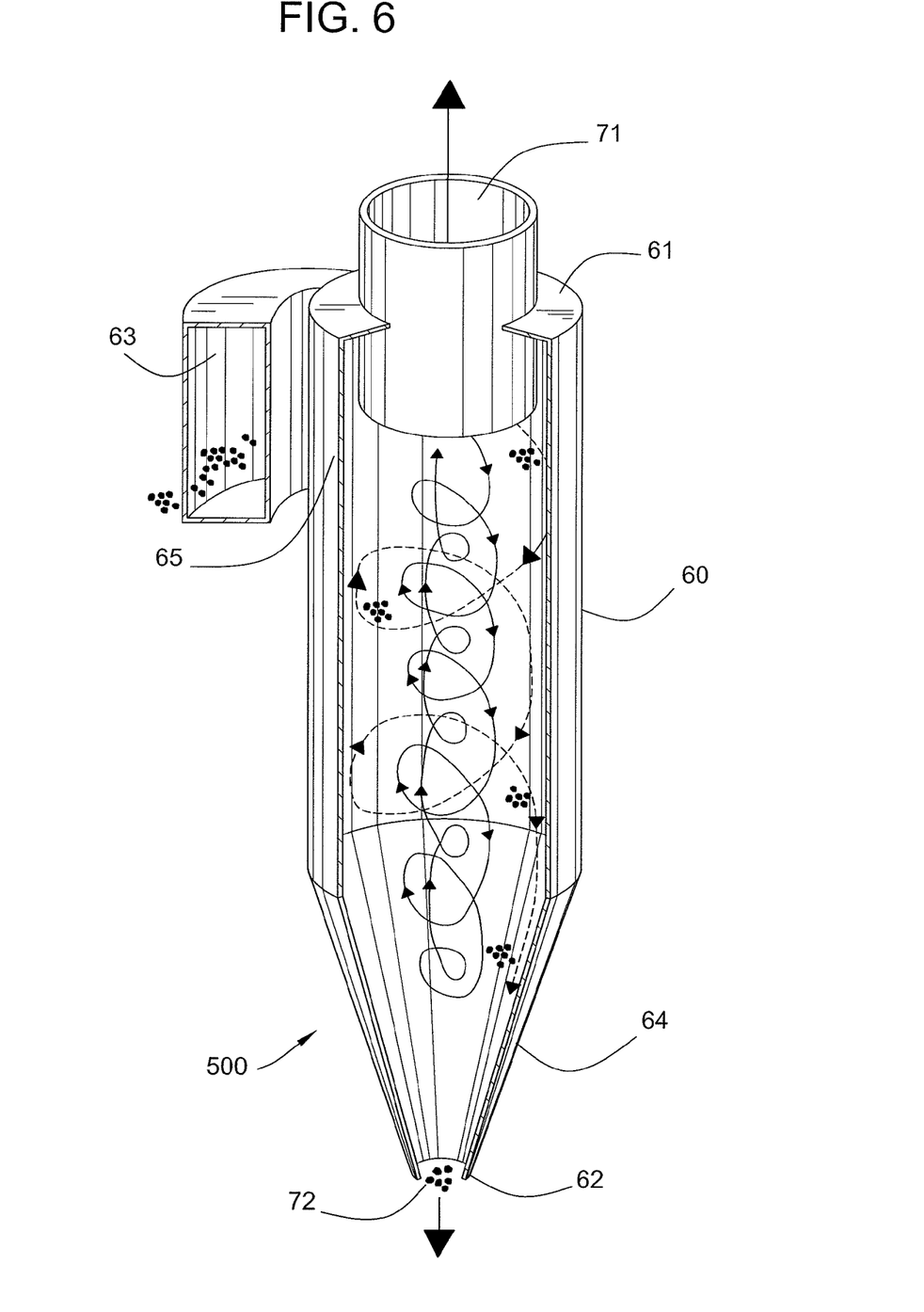
FIG. 6 is a partially cut-away schematic view of another embodiment of an inertial separator according to the present invention, also showing the passage of air and contaminants through the separator.

FIG. 6 shows another illustrative embodiment of an inertial separator 600 comprising a generally tubular body 60 comprising a first end 61 and a second end 62, an inlet 63, and first and second generally coaxial outlets 71, 72, wherein the second end 62 of the body comprises a tapered end 64 comprising the second coaxial outlet 72, and the first end 61 of the body further comprises the first coaxial outlet 71. In this illustrated embodiment, the body has a sidewall 65 further comprising the inlet 63.

Figure 7A:
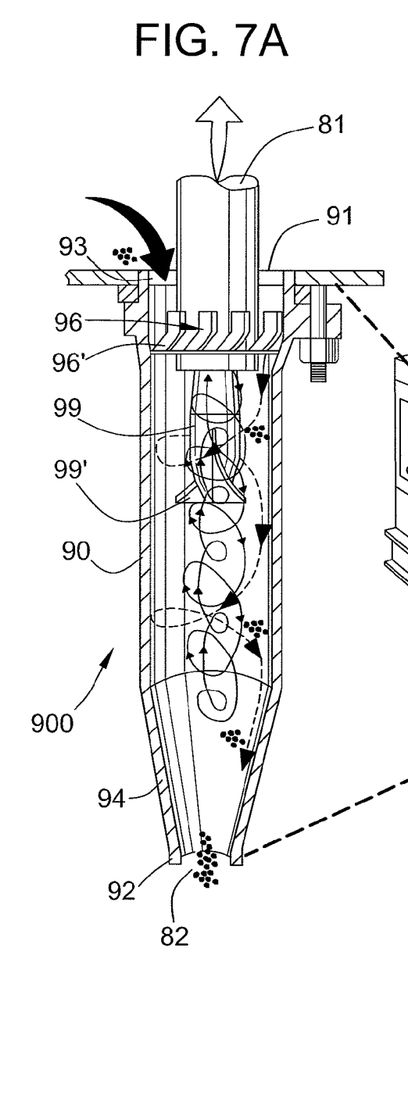
FIG. 7A is a partially cut-away schematic view of another embodiment of an inertial separator according to the present invention, also showing the passage of air and contaminants through the separator.

FIG. 7 shows another illustrative embodiment of an inertial separator 900 comprising a generally tubular body 90 comprising a first end 91 and a second end 92, an inlet 93, and first and second generally coaxial outlets 81, 82, wherein the second end 92 of the body comprises a tapered end 94 comprising the second coaxial outlet 82, and the first end 91 of the body further comprises the first coaxial outlet 81. In this illustrated embodiment, the separator further comprises a spinner vane 96 mounted on the first coaxial outlet 81, wherein the spinner vane comprises a plurality of vanes 96'. In a more preferred embodiment, as shown in FIG. 7A, the separator further comprises a deflector 99 including at least two vanes 99'.

In accordance with preferred embodiments of the invention, the tubular body (e.g., illustrated as 60 in FIG. 6 and 90 in FIG. 7A) comprises any of the embodiments of the composition described with respect to the tubular housing and vaned deflector above. In more preferred embodiments, the spinner vane and/or deflector with vanes (e.g., illustrated as 96 and 99 in FIG. 7A) comprises any of the embodiments of the composition described with respect to the tubular housing and vaned deflector above.

Cyclic olefin polymers suitable for use in accordance with embodiments of the invention are manufactured by various companies, including, for example, Mitsui Chemical Co. (e.g., polymers available under the tradename APEL™); Topas Advanced Polymers Inc. (Florence, Ky., e.g., polymers available under the tradename TOPAS®); Japan Synthetic Rubber; and Zeon Chemicals, L.P. (Louisville, Ky., e.g., polymers available under the tradename ZEONOR®). There are two types of polymers in this class: cyclic olefin copolymers (COC) and cyclic olefin polymers (COP). Cyclic olefin copolymers may be produced by chain copolymerization (such as by metallocene catalysis) of cyclic monomers such as norbornene or tetracyclododecene with ethane. Cyclic olefin polymers may be produced by ring-opening metathesis polymerization of various cyclic monomers followed by hydrogenation. The cyclic olefin copolymers typically are highly amorphous and have high glass-transition temperatures ($T_g$), low shrinkage, low moisture absorption, and low birefringence. In one embodiment, the polymer is a cyclic olefin copolymer of ethylene and norbornene, such as a polymer commercially available from Topas Advanced Polymers, Inc., under the tradename TOPAS®, e.g., Topas® 6013, Topas® 6015, and Topas® 6017. The ratio of norbornene to ethylene can be varied, e.g., depending on the application for the inertial separator, for example, an application wherein toughness is desirable, versus an application wherein a higher maximum operating temperature is desirable. In some applications, e.g., wherein a thinner walled inertial separator is desirable, the use of a COC copolymer in an embodiment of the composition may be preferred over the use of a COP polymer. The composition of the present invention may include more than one polymer. The polymer of the composition may include two cyclic olefin copolymers or more than two cyclic olefin copolymers.

In accordance with embodiments of the present invention, the COC or COP may be present in the composition in any effective amount, for example, in an amount of in the range of from about 50% to about 90% by weight of the composition, typically, in an amount of in the range of from about 60% to about 85% by weight.

In those embodiments of the composition and inertial separator according to the present invention including at least one nano-structured chemical additive, one or more nano-structured chemical additives may be polyhedral oligomeric silsesquioxanes. Polyhedral oligomeric silsesquioxane molecules suitable for use in accordance with embodiments of the invention include those manufactured by, for example, Hybrid Plastics Inc. (Hattiesburg, Miss.) and are commercially available under the tradename POSS®. They are described in, for example, U.S. Pat. Nos. 6,972,312 and 6,770,724.

POSS® nanostructure compositions are represented by the formula:

$[(RSiO_{1.5})_n]_{\Sigma\#}$ for homoleptic compositions $[(RSiO_{1.5})_m(R'SiO_{1.5})_n]_{\Sigma\#}$ for heteroleptic compositions $[(RSiO_{1.5})_m(RXSiO_{1.0})_n]_{\Sigma\#}$ for functionalized heteroleptic compositions $[(RSiO_{1.5})_m(R'SiO_{1.5})_n(RXSiO_{1.0})_p]_{\Sigma\#}$ for functionalized heteroleptic compositions $[(XSiO_{1.5})_n]_{\Sigma\#}$ for homoleptic silicate compositions.

In all of the above R=organic substituent (H, cyclic or linear aliphatic or aromatic groups that may additionally contain reactive functionalities such as alcohols, esters, amines, ketones, olefins, ethers, or halides) and X includes but is not limited to OH, Cl, Br, I, alkoxide (OR), ester (O(CO)R), peroxide (OOR), amine ($NR_2$), isocyanate (NCO), and R. Homoleptic systems contain only one type of R group while heteroleptic systems contain more than one type of R group. The symbols m, n and p refer to the stoichiometry of the composition. The symbol $\Sigma$ indicates that the composition forms a nanostructure, and the symbol # refers to the number of silicon atoms contained within the nanostructure. The value for # is the sum of the lettered substituents in a compound, e.g. m+n or m+n+p. It should be noted that $\Sigma\#$ is not to be confused as a multiplier for determining stoichiometry, as it merely describes the overall nanostructural characteristics of the POSS® system (sometimes referred to as the "cage size").

Any effective POSS® or combination of POSS® may be used in the composition and inertial separator of the invention. One of skill in the art will be able to select a POSS® with substituents tailored to provide a desired effect. Illustrative examples of particular POSS molecules effective in embodiments of the invention are OctaIsobutyl-POSS® and TriSilanolIsobutyl POSS®. Other suitable POSS® additives may be chosen to select for desirable properties of the finished product. Such POSS additives include but are not limited to DodecaPhenyl POSS®; Isooctyl POSS®; PhenylIsobutyl POSS®; PhenylIsooctyl POSS®; IsooctylPhenyl POSS®; IsobutylPhenyl POSS®; OctaIsobutyl POSS®; OctaMethyl POSS®; OctaPhenyl POSS®; OctaTMA POSS®; OctaTrimethylsiloxy POSS®; NorbornenylethylEthyl POSS®; AllylIsobutyl POSS®; MonoVinylIsobutyl POSS®; OctaVinyl POSS®; OctaVinyldimethylsilyl POSS®; DiSilanoIIsobutyl POSS®; TriSilanolIsooctyl POSS®; TriSilanolPhenyl POSS®; and TetraSilanolPhenyl POSS®. In some embodiments, a partially condensed silanol POSS®, e.g., TriSilanolPhenyl POSS®, and TriSilanolIsobutyl POSS®, is preferred.

In accordance with embodiments of the present invention, POSS® may be present in the composition in any effective amount, for example, in an amount of in the range of from about 0.1% to about 10% by weight, typically in the range of from about 1% to about 5% by weight.

Advantageously, it has been found that the use of POSS improves strength and ductility of the cyclic olefin polymer and/or copolymer sufficiently such that the need for higher concentrations of one or more of high density glass fiber fillers, powdered carbon fillers, and flame retardant fillers, can be reduced or eliminated, thus reducing cost. Other advantages include one or more of: reducing melt-viscosity, increasing melt phase shear strength, improving the injection mold process (e.g., by eliminating or reducing glass fiber fillers), reduced injection mold die wear, reduced air friction of the surface, and increased abrasion resistance of the surface.

A slip agent may be used in an embodiment of the invention to, for example, decrease friction between the composition and production equipment. Alternatively, or additionally, the slip agent may also be used as a mold release agent for injection molding. Any effective slip agent may be used in the present invention. Slip agents useful in the present invention may be chosen by one of skill in the art from known slip agents. Such slip agents may include, for example, polyol esters and long chain fatty acid amides, such as oleamide. A polyol ester type slip agent that may be used in the present invention is sold under the trade name GLYCOLUBE® by Lonza Group Ltd. An oleamide slip agent is marketed as ATMER™ SA 1759 by Ciba Specialty Chemicals Inc. In embodiments of the present invention including a slip agent, the slip agent may be present in the composition in any effective amount, such as, for example, an amount in the range of from about 0.01% to about 0.5% by weight, typically in the range of from about 0.1% to about 0.4% by weight.

A mold release agent may be used in an embodiment of the composition of the invention to, for example, improve release from the mold release agent during injection molding. Any effective mold release agent may be used in the present invention. Mold release agents useful in the present invention may be chosen by one of skill in the art from known mold release agents, and illustrative suitable agents comprise a polypropylene polymer (e.g., isotactic polypropylene available under the tradename HIVAL® (Ashland Inc., Covington, Ky.)) and a siloxane polymer (e.g., an ultrahigh molecular weight siloxane polymer available under the tradename GENIOPLAST® PELLET S (Wacker Chemie AG, Munich, Germany). In embodiments of the present invention including a mold release agent, the mold release agent may be present in any effective amount. In some embodiments wherein the mold release agent comprises polypropylene, the composition includes polypropylene in the range of about 2% to about 10% by weight, typically in the range of from about 5% to about 8% by weight.

An impact modifier may be used in an embodiment of the composition of the invention to, for example, improve moldability and/or to improve UV resistance. Alternatively, or additionally, an embodiment of the composition can include a light stabilizer to improve UV resistance. Suitable impact modifiers and light stabilizers are known in the art. In one embodiment, the impact modifier comprises a styrene-ethylene/butylene-styrene (SEBS) block copolymer, such as, for example, KRATON® G1654 SEBS polymer (Kraton Polymers U.S., LLC, Houston, Tex.). In those embodiments of the present invention including an impact modifier, the impact modifier may be present in any effective amount, for example, an amount in the range of from about 5% to about 25% by weight, more typically, in the range of from about 5% to about 15% by weight. Suitable light stabilizers include, for example, hindered amine light stabilizers (HALS) such as Uvinul 5050H, BASF Corporation, Florham Park, N.J.) and those available under the tradename CHIMASSORB® from Ciba-Geigy, e.g., Ciba® CHIMASSORB® 119FL). In those embodiments of the present invention including a light stabilizer, the light stabilizer may be present in any effective amount, for example, an amount in the range of from about 0.1% to about 1.5% by weight.

An antioxidant, e.g., a process antioxidant, may be used in an embodiment of the composition to, for example, inhibit oxidation and improve the stability of polymer melt flow, e.g., during injection molding. Suitable antioxidants include, for example, those sold under the tradename IRGANOX® (e.g., Irganox® grade B225) by Ciba Corporation (Ciba Specialty Chemicals, Tarrytown, N.Y.). In those embodiments of the present invention including an antioxidant, the antioxidant may be present in any effective amount, for example, an amount in the range of from about 0.05% to about 0.5% by weight.

An anti-static agent may be used in an embodiment of the composition to increase static charge dissipation in the composition and/or the inertial separator, e.g., to impart static dissipative properties to the inertial separator. Suitable anti-static agents include metal fibers, metal particles, and more preferably, carbon nanotubes. Examples of suitable carbon nanotubes include those available from Bayer Material Science, Leverkusen, Germany, and Hyperion Catalysis, International, Inc. (Cambridge, Mass., e.g., available under the tradename FIBRIL™). In embodiments of the present invention, the anti-static agent may be present in any effective amount, for example, an amount in the range of about 3% to about 25% by weight, typically in the range of from about 5% to about 10% by weight.

Advantageously, it has been found that the use of POSS® can assist in the dispersion of other particulate additives in forming the composition. For example, when an anti-static additive such carbon nanotubes (e.g., functionalized carbon nanotubes such as carboxylic acid functionalized carbon nanotubes) is blended with POSS® (e.g., AminopropylPhenyl POSS® or Aminopropyl Isobutyl POSS®) the electrically conductive percolating fiber network is finely dispersed, allowing the use of a low concentration level of the anti-static agent.

In some embodiments, the inertial separator has a surface resistivity of at least about $10^3$ 'Ω/sq., in some embodiments, at least about $10^4$ 'Ω/sq., e.g., in the range of from $10^4$ 'Ω/sq. to $10^{12}$ 'Ω/sq.

A viscosity modifier may be used in embodiments of the invention to increase or decrease the viscosity of the composition and improve its handling or processing. The viscosity modifier may be used to decrease the melt viscosity of the composition and render the composition more favorable for extrusion or injection molding. Any effective viscosity modifier may be used in the present invention. Viscosity modifiers useful in the present invention may be chosen by one of skill in the art from known viscosity modifiers. Such viscosity modifiers may include a polymer, such as a polypropylene polymer. In embodiments of the composition of the present invention, the viscosity modifier may be present in any effective amount.

Embodiments of the invention may also include additional components that can be selected by one of skill in the art to modify characteristics of the composition and/or the separator, e.g., to provide for one or more of the following: improve the final product, change the appearance of the product, improve the handling of the composition, and improve the processing of the composition. Such characteristics include but are not limited to, one or more of the following: glass transition temperature, melting temperature, melt viscosity, moldability, lubrication, static charge dissipation, material strength, surface finish, environmental and/or chemical resistance, optical clarity, color, product weight, rigidity, creep resistance, flame-retardance, and the like. The additional components that may be added will be known to one of skill in the art.

With respect to flame-retardance, suitable flame retardants include, for example, decabromodiphenyl ether (Deca-BDE, e.g., Grade DE-83R available from Great Lakes Chemical Corporation) and a non-diphenyl oxide based brominated flame retardant, e.g., Firemaster® 2100 (Great Lakes Chemical Corporation, West Lafayette, Ind.), and products available under the tradename NYACOL® (Nyacol Nano Technologies, Inc., Ashland, Mass.). In some embodiments, the flame retardant is used with a synergist, e.g., antimony trioxide ($Sb_2O_3$). In an embodiment of the composition of the present invention, the flame retardant (and synergist) may be present in any effective amount and retardant/synergist ratio. Typically, the flame retardant or flame retardant/synergist is present in an amount in the range of about 3% to about 20% by weight of the composition, e.g., in the range of from about 5% to about 15% by weight, preferably, in the range of from about 8% to about 13% by weight. In one embodiment, the ratio of flame retardant to synergist is about 3:1, but other ratios are suitable and can be determined by one of skill in the art. Preferably, in those embodiments of the invention wherein the composition includes a flame retardant, the composition does not include a light stabilizer.

In some embodiments, the separators have a flame retardance rating conforming to, for example, RTCA/DO-160 Revision E (dated Jun. 20, 2006), Section 26 Fire, Flammability, Category C, criteria per table 26-1 for vertical burn test for equipment, component parts, or subassemblies for installation inside a metallic box (published by Radio Technical Commission for Aeronautics) with respect to (a) distance before stop of the flame or growing combustion: 120 mm max (if specimen length is less than 127 mm it can burn with flame or glowing combustion up to the holding charge; (b) maximum duration of flaming combustion after each application of the test flame: 30 seconds after first application; (c) cumulative duration of total flaming combustion after 10 flame applications for five specimens: 250 seconds after 10 applications with five specimens; and (d) maximum duration of glowing combustion after second removal of test flame: 60 seconds.

With respect to colorants, embodiments of the invention can be any desired color, and thus, a variety of colorants are suitable for use in the invention. Suitable colorants include, but are not limited to, those commercially available from Clariant (Coventry, R.I.), and Cabot Corporation (Alpharetta, Ga.). Typically, when using colorants other than carbon black, a light stabilizer is also used, e.g., a hindered amine light stabilizer, and some commercially available colorants include such stabilizers. In an embodiment of the composition of the present invention, the colorant may be present in any effective amount, such as an amount of about 1% to about 8% by weight. Similarly, the light stabilizer, if present, may be present in any effective amount, for example, in the range of from about 0.2% to about 1.2% by weight.

Embodiments of the invention are suitable for removing any solid contaminant (e.g., dust particles) from air, gas, an aerosol, and/or a liquid.

Figure 2A:
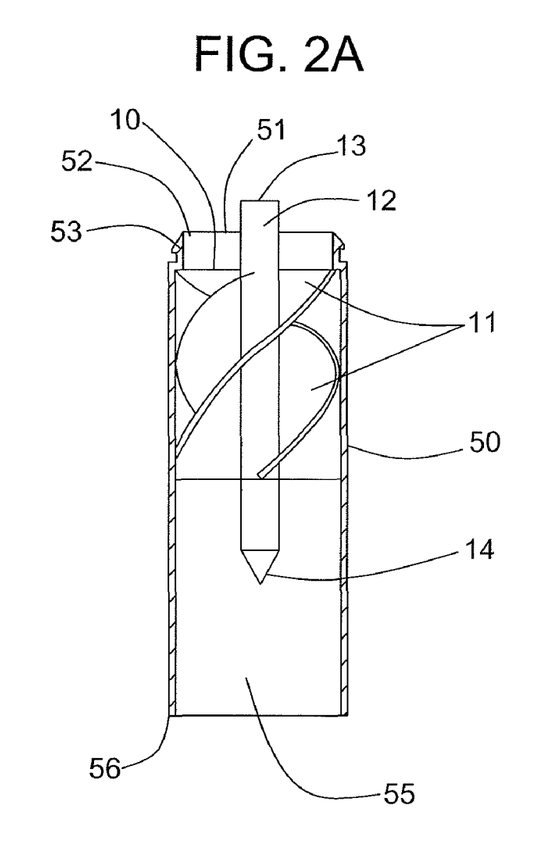
FIG. 2A is a partial cut-away view.
Figure 2B:
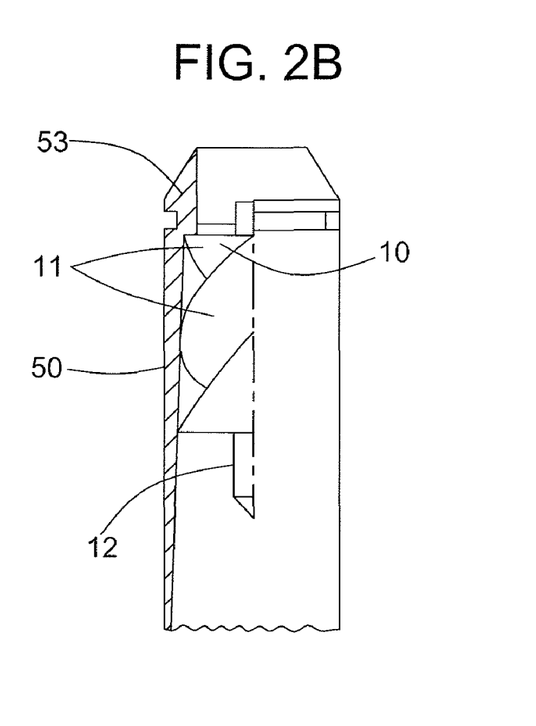
FIG. 2B is a partial cut-away view and a partial perspective view.
Figure 4:
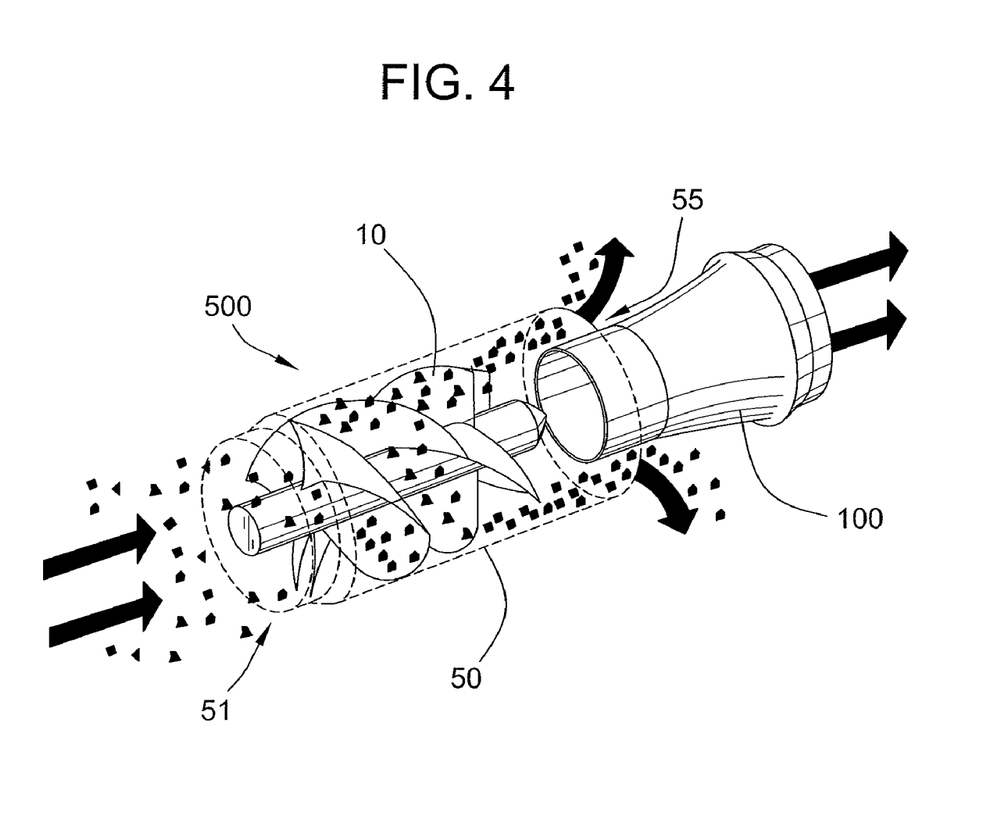
FIG. 4 is a perspective view showing air and contaminants passing through an illustrative inertial separator according to the present invention.

In operation of some embodiments of inertial separators, and using the embodiments illustrated in FIGS. 1-3 for reference, influent contaminant-containing air or gas enters the tubular housing and encounters the vaned deflector. The vanes of the deflector form a vortex stream in the influent air. As shown in for example, FIG. 4, the solid contaminants, e.g., dust particles, are thrown to the periphery of the housing since they are relatively heavy, leaving the air at the center relatively contaminant-free. The contaminants are collected at the periphery of the tube and are drawn off (sometimes referred to as "scavenged") from the annular space between the outlet member and the tubular housing. Clean air is drawn off from the center of the tubular housing through the central passage of the outlet member.

Figure 5:
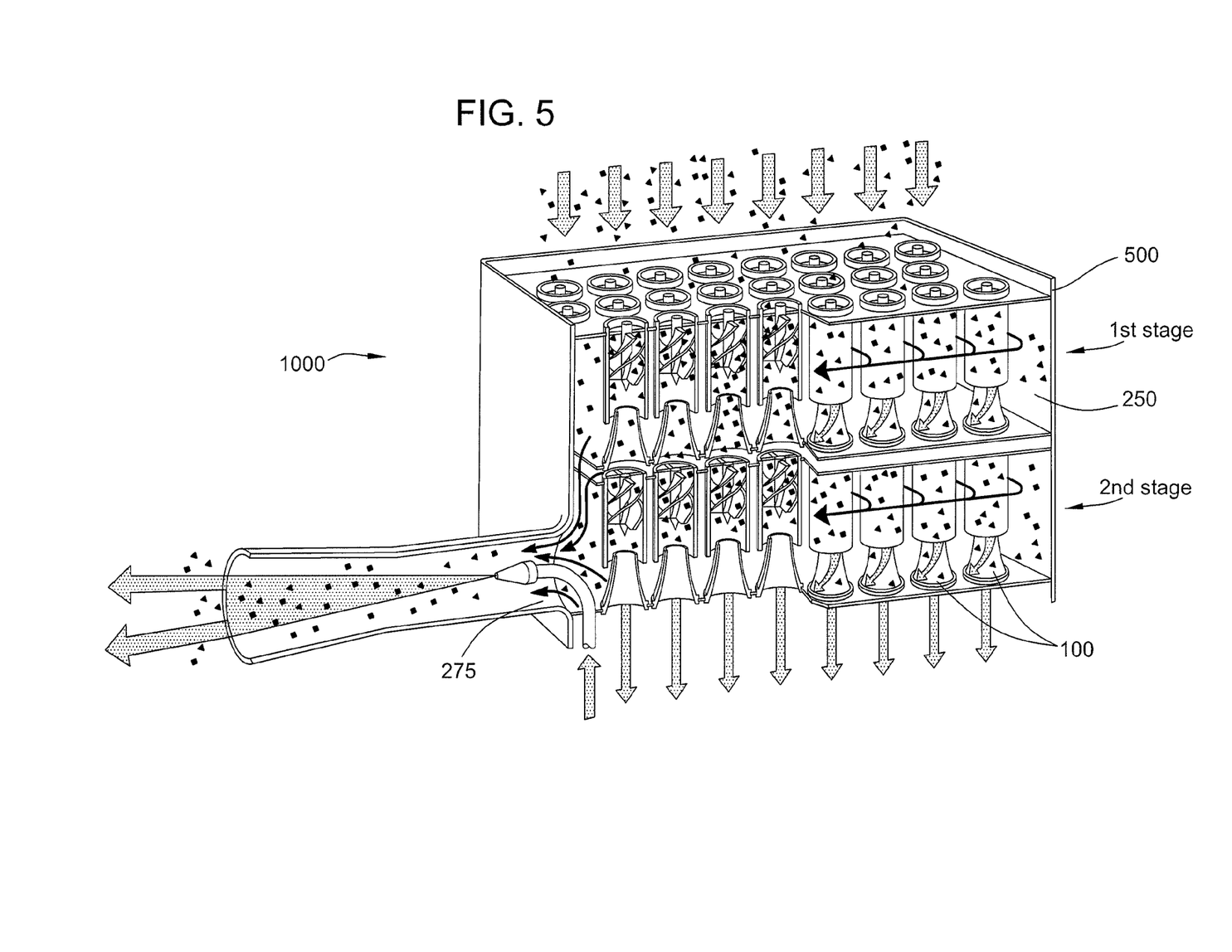
FIG. 5 is a partial cut-away view and a partial perspective view of an embodiment of an inertial separator array according to the present invention, also showing air and contaminants passing through the array.

Typically, two or more inertial separators are utilized together in an assembly, e.g., arranged side by side in a housing and mounted on plates with the separator inlets and outlets in register and the passages parallel to one another. If desired, the assembly can include a plurality of stages spaced in the direction of flow, and, in some assemblies, the stages can be identical so that each device in one stage has a corresponding device in the other stage. For example, a plurality of inertial separators can be arranged in an array, e.g., array 1000 as shown in FIG. 5, showing a housing and first and second stages, each stage including a plurality of inertial separators, that also illustrates a scavenge chamber 250 for collecting and drawing off the contaminants through scavenge port 275, as well as the passage of influent contaminant-containing air or gas, dust particles, and contaminant-free air or gas. However, while FIG. 5 shows the axes of the separators in the first stage in parallel with the axes of the separators in the second stage, in other embodiments of the invention (not shown), the axes of the separators in the one stage can be offset from the axes of the separators in another stage, e.g., as described in UK Patent Application GB 2,324,484. The offset can be varied to optimize, for example, the overall particulate separation efficiency with particular particulate sizes. For example, the offset can be in the range of from about 10% of the tube diameter to about 90% of the tube diameter. Alternatively, or additionally, there could be a greater number of inertial separators in one stage than another stage and/or the separators in one stage could have a different diameter than the separators in another stage. Other suitable configurations of inertial separators providing arrays suitable for use in accordance with embodiments of the invention include, for example, those disclosed in U.S. Pat. Nos. 3,915,679, and 4,050,913.

In some applications, the array can include 100 or more, e.g., hundreds, or 1000 or more, even thousands, of inertial separators. Accordingly, the reduction in weight (compared to conventional inertial separators) provided by embodiments of the invention is a significant advantage.

In operation of the array, and as shown in FIG. 5, influent contaminant-containing air or gas enters the tubular housings and encounters the vaned deflectors, the vanes of the deflector form vortex streams in the influent air, and clean air is drawn off from the centers of the tubular housings through the central passages of the outlet members. The contaminants are collected at the peripheries of the tubes and are drawn off, typically via a scavenge flow passed through the array to remove particles exiting the separators, e.g., the scavenge passages of the separators empty into a common scavenge chamber, and a scavenge port in a wall of the scavenge chamber provides for the removal of the contaminant particles.

If desired, individual inertial separators can be replaced within an array over a period of time, rather than replacing the array if separators become worn or damaged. Alternatively, or additionally, separators may be replaced as part of a maintenance schedule, e.g., after a set time period. The replacement separators may have one or more different characteristics than the separator being replaced. For example, the replacement separators may have larger outer diameters than the replaced separators and/or may differ in appearance (e.g., with respect to color) for ease of identifying which separators have previously been replaced. Illustratively, inertial separators may have distinct colors such as blue, green, and black and/or the separators may have different patterns, e.g., of colors, allowing one to recognize which separators had been previously replaced, e.g., an original separator might be black, a replacement, or a first replacement, might be blue, etc.

Moreover, embodiments of the invention can be suitable for use with existing commercial arrays, e.g., to replace one or more individual inertial separators with one or more individual inertial separators according to embodiments of the invention.

Accordingly, a method of maintaining an inertial separator array according to an embodiment of the invention comprises (a) obtaining an inertial separator array comprising a plurality of inertial separators; and (b) replacing at least one inertial separator with an inertial separator according to an embodiment of the invention. In some embodiments, the method comprises replacing at least one inertial separator in the array with a replacement inertial separator having a different characteristic, e.g., color, than the characteristic, e.g., color, of the inertial separator being replaced. Alternatively, or additionally, in some embodiments of the invention, the method includes replacing at least one inertial separator according to an embodiment of the invention with another inertial separator according to an embodiment of the invention.

In operation of some other embodiments of inertial separators according to the invention, e.g., using the embodiment illustrated in FIG. 6 for reference (shown in the Figure as a large diameter reverse cyclone), influent contaminant-containing air or gas enters the inlet and passes into the tubular body tangentially, and creates a weak vortex of spinning gas in the cyclone body. Particles move toward the cyclone body wall and the tapered or conical section of the cyclone (as illustratively shown in the dashed lines), and pass through the second outlet, e.g., passing into a hopper. The gas moves in a tighter spiral (as illustratively shown in solid lines, the movement of additional particles toward the body wall is not shown), turns, and the cleaned gas exits the cyclone through the first outlet.

Figure 7B:
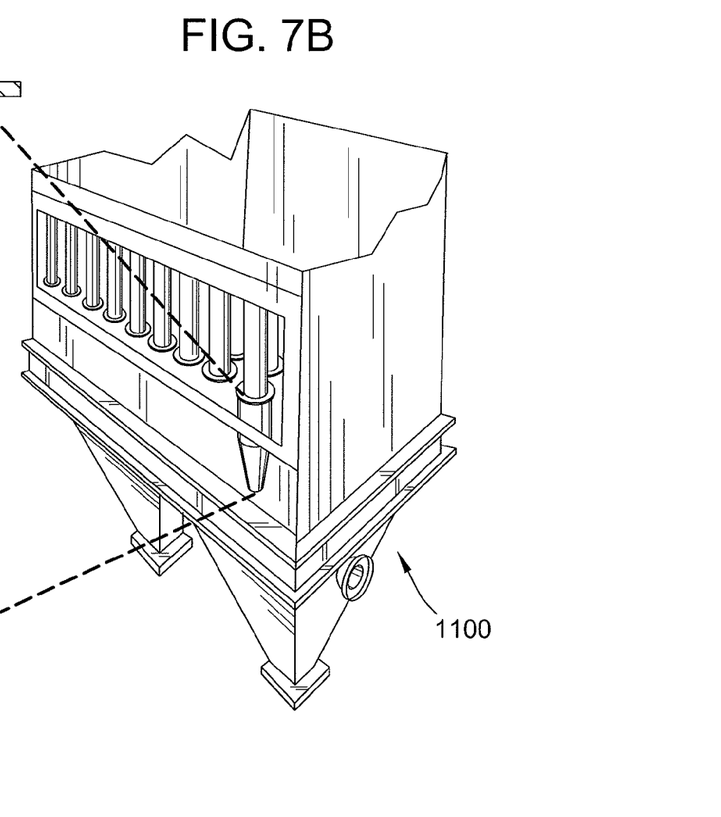
FIG. 7B shows an embodiment of a collector including a plurality of collectors shown in FIG. 7A.

In operation of some other embodiments of inertial separators according to the invention, e.g., using the embodiment illustrated in FIG. 7A for reference (shown in the Figure as a small diameter cyclone), influent contaminant-containing air or gas enters the inlet and passes into the tubular body, contacting the vanes of the spinner vane, creating a spinning movement of the gas stream in the cyclone body (the spinner vane itself does not spin). In those embodiments including a deflector, the deflector increases the spinning movement. Particles move toward the cyclone body wall and the tapered or conical section of the cyclone (as illustratively shown in the dashed lines), and pass through the second outlet. The gas moves in a tighter spiral (as illustratively shown in solid lines, the movement of additional particles toward the body wall is not shown), turns, and the cleaned gas exits the cyclone through the first outlet. Typically, as shown in FIG. 7B, a collector 1100 includes a plurality of small-diameter cyclone tubes.

While the inventive composition is describe above for forming an inertial separator (inertial separators including, for example, vortex air cleaners, inlet particle separators, engine air particle separators, and cyclones (e.g., large-diameter cyclones and small-diameter multi-cyclones)), the composition can be used in other applications, e.g., for forming any type of housing.

The following examples further illustrate the invention but, of course, should not be construed as in any way limiting its scope.

EXAMPLE 1

This example demonstrates the preparation of a composition according to an embodiment of the invention.

Injection mold grade cyclic olefin copolymer (Topas® 6015S04, Topas Advanced Polymers Inc., Florence, Ky.) is mixed with powdered polyhedral oligomeric silsesquioxane (TriSilanolIsobutyl POSS®, S01450, Hybrid Plastics, Inc., Hattiesburg, Miss.), impact modifier (KRATON® G1654H SEBS polymer, Kraton Polymers U.S., LLC, Houston, Tex.), and colorant (Green Pigmented Polypropylene 0M64620047 (that includes a hindered light stabilizer and an antioxidant), Clariant, Coventry, R.I.), in a co-rotating twin screw extruder to produce pellets for use in injection molding. The percentages by weight are as follows: cyclic olefin copolymer 81%, polyhedral oligomeric silsesquioxane 3%, impact modifier 11%, and colorant 5%.

EXAMPLE 2

This example demonstrates that a composition according to an embodiment of the invention is suitable for producing an inertial separator.

The composition according to Example 1 is injection molded to form inertial separators having the general format shown in FIGS. 1-3. The walls of the tubular housing have a thickness in the range of about 0.3 mm. The components of the separators are non-porous.

EXAMPLE 3

This example demonstrates the preparation of a composition according to another embodiment of the invention.

Injection mold grade cyclic olefin copolymer (Topas® 6015S04, Topas Advanced Polymers Inc., Florence, Ky.) is mixed with powdered polyhedral oligomeric silsesquioxane (TriSilanolIsobutyl POSS®, S01450, Hybrid Plastics, Inc., Hattiesburg, Miss.), impact modifier (KRATON® G1654H SEBS polymer, Kraton Polymers U.S., LLC, Houston, Tex.), flame retardant (Decabromodiphenyl Ethane Grade, Firemaster® 2100, Great Lakes Chemical Corporation, West Lafayette, Ind.), synergist (Antimony trioxide Red Star® $Sb_2O_3$, Great Lakes Chemical Corporation, West Lafayette, Ind.), mold release agent (isotactic polypropylene Hival® 2420, Ashland, Inc., Covington, Ky.), pigment (Carbon Black Vulcan 9A32, Cabot Corporation, Alpharetta, Ga.), hindered amine light stabilizer (Uvinul 5050H, BASF Corporation, Florham Park, N.J.), and antioxidant (Phenolic/Phosphite Blend Process Antioxidant, Irganox® B225, Ciba Specialty Chemicals, Tarrytown, N.Y.), in a co-rotating twin screw extruder to produce pellets for use in injection molding.

The percentages by weight are as follows: cyclic olefin copolymer 70.1%, polyhedral oligomeric silsesquioxane 2.6%, impact modifier 9.5%, flame retardant 9%, synergist 3%, mold release agent 2.5%, pigment 2.5%, hindered light stabilizer 0.5%, and antioxidant 0.25%.

EXAMPLE 4

This example demonstrates that a composition according to an embodiment of the invention is suitable for producing an inertial separator.

The composition according to Example 3 is injection molded to form inertial separators having the general format shown in FIGS. 1-3. The walls of the tubular housing have a thickness of about 0.3 mm. The components of the separators are non-porous. The separators have a flame retardance rating conforming to RTCA/DO-160 Revision E, Section 26, Category C, Criteria per Table 26-1.

EXAMPLE 5

This example demonstrates the preparation of a composition according to another embodiment of the invention, and demonstrates that the composition is suitable for producing an intertial separator.

Injection mold grade cyclic olefin copolymer (Topas® 6015S04, Topas Advanced Polymers Inc., Florence, Ky.) is mixed with powdered polyhedral oligomeric silsesquioxane (TriSilanolIsobutyl POSS®, S01450, Hybrid Plastics, Inc., Hattiesburg, Miss.), impact modifier (KRATON® G1654H SEBS polymer, Kraton Polymers U.S., LLC, Houston, Tex.), flame retardant (Decabromodiphenyl Ethane Grade, Firemaster® 2100, Great Lakes Chemical Corporation, West Lafayette, Ind.), synergist (Antimony trioxide Red Star® $Sb_2O_3$, Great Lakes Chemical Corporation, West Lafayette, Ind.), mold release agent (GENIOPLAST®PELLET S, Wacker Chemie AG), colorant (Green Pigmented Polypropylene 0M64620047 (that includes a hindered light stabilizer and an antioxidant, Clariant, Coventry R.I.), in a co-rotating twin screw extruder to produce pellets for use in injection molding.

The percentages by weight are as follows: cyclic olefin copolymer 64.4%, polyhedral oligomeric silsesquioxane 2.6%, impact modifier 10%, flame retardant 9%, synergist 3%, mold release agent 6%, and pigment 5%.

The composition is injection molded to form inertial separators having the general format shown in FIGS. 1-3. The walls of the tubular housing have a thickness in the range of about 0.3 mm. The components of the separators are non-porous. The separators have a flame retardance rating conforming to RTCA/DO-160 Revision E, Section 26, Category C, Criteria per Table 26-1.

EXAMPLE 6

This example demonstrates the preparation of a composition according to another embodiment of the invention.

Injection mold grade cyclic olefin copolymer (Topas® 6015S04, Topas Advanced Polymers Inc., Florence, Ky.) is mixed with powdered polyhedral oligomeric silsesquioxane (TriSilanolIsobutyl POSS®, S01450, Hybrid Plastics, Inc., Hattiesburg, Miss.), impact modifier (KRATON® G1654H SEBS polymer, Kraton Polymers U.S., LLC, Houston, Tex.), carbon nanotubes (FIBRIL™, Hyperion Catalysis International, Inc., Cambridge, Mass.), mold release agent (GENIOPLAST® PELLET S, Wacker Chemie AG), hindered amine light stabilizer (Ciba® CHIMASSORB® 119FL, Ciba-Geigy), and antioxidant (Phenolic/Phosphite Blend Process Antioxidant, Irganox® B225, Ciba Specialty Chemicals, Tarrytown, N.Y.), in a co-rotating twin screw extruder to produce pellets for use in injection molding.

The percentages by weight are as follows: cyclic olefin copolymer 66%, polyhedral oligomeric silsesquioxane 3%, impact modifier 20%, carbon nanotubes 5%, mold release agent 5%, hindered amine light stabilizer 0.5%, and antioxidant 0.25%.

The composition is injection molded to form inertial separators having the general format shown in FIGS. 1-3.

EXAMPLE 7

This example demonstrates a composition according to an embodiment of the invention is dissipative or conductive.

Rectangular sample bars are formed using the composition described in Example 6. The ends of the bars are masked and painted with a silver conductive paint. The unpainted area between the ends is measured to the nearest 0.001 inches. Direct resistance measurements are made using an ohmmeter, and volume and surface resistivity are calculated based on dimensions and resistance measures.

The volume resistivity is $8.8 \times 10^4$ $\Omega$-cm and the surface resistivity is $8.9 \times 10^4$ $\Omega$/sq.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An inertial separator comprising
a generally tubular body comprising a first end and a second end, an inlet, and first and second generally coaxial outlets, wherein the second end of the body comprises a tapered end comprising the second coaxial outlet, and the first end of the body further comprises the first coaxial outlet, and,
the tubular body comprises a composition comprising a polymer and a polyhedral oligomeric silsesquioxane and/or a flame retardant and/or an anti-static additive, wherein the polymer is selected from the group consisting of a cyclic olefin polymer and a cyclic olefin copolymer.

2. An inertial separator comprising
(a) a tubular body having an inlet at one end, an outlet at the opposite end, and a central passage therebetween, the central passage having a peripheral portion and a central portion;
(b) a deflector coaxially mounted in the passage, the deflector having a plurality of spaced centrally joined helical vanes abutting the wall of the passage, and positioned at an angle to the line of air flow from the inlet to the outlet, so as to create a vortex stream of influent air centrifugally concentrating contaminant particles in the air at the periphery of the passage, and leaving air at the center of the passage relatively free from contaminant particles;
(c) a generally coaxial outlet member positioned within the outlet end of the tubular body, the outlet member having an inlet at one end, and an outlet at the opposite end, and a central passage therebetween for delivery of clean air from the central portion of the central passage of the tubular body, the inlet end of the outlet member being of lesser diameter than the central passage of the tubular body;
wherein the tubular body and the deflector each comprise a composition comprising: a polymer selected from the group consisting of a cyclic olefin copolymer and a cyclic olefin polymer; and, a polyhedral oligomeric silsesquioxane and/or a flame retardant and/or an anti-static additive.

3. The inertial separator of claim 2, wherein the composition comprises the polymer, the polyhedral oligomeric silsesquioxane, and the anti-static additive.

4. The inertial separator of claim 1, wherein the polymer is a cyclic olefin copolymer.

5. An inertial separator array comprising two or more inertial separators, wherein at least one inertial separator comprises an inertial separator according to claim 1.

6. The inertial separator of claim 1, wherein the composition comprises a polyhedral oligomeric silsesquioxane, wherein the polyhedral oligomeric silsesquioxane is a partially condensed silanol polyhedral oligomeric silsesquioxane.

7. The inertial separator of claim 1, wherein the outlet member comprises a composition comprising a polymer, and, a polyhedral oligomeric silsesquioxane and/or flame retardant and/or an anti-static additive, wherein the polymer is selected from the group consisting of a cyclic olefin copolymer and a cyclic olefin polymer.

8. The inertial separator of claim 7, wherein the outlet member and, the tubular body, comprise the same composition.

9. An inertial separator array, comprising at least two inertial separators according to claim 1.

10. The inertial separator array according to claim 9, wherein at least one inertial separator in the array has a different color than at least one other inertial separator in the array.

11. A method of maintaining an inertial separator array comprising:
   (a) obtaining an inertial separator array comprising a plurality of inertial separators; and
   (b) replacing at least one inertial separator with an inertial separator according to claim 1.

12. The method of claim 11, comprising replacing at least one inertial separator with a replacement inertial separator having a different color than the color of the inertial separator being replaced.

13. The inertial separator of claim 2, wherein the composition comprises the polymer, the polyhedral oligomeric silsesquioxane, and the flame retardant.

14. The inertial separator of claim 13, wherein the composition further comprises a synergist.

15. The inertial separator of claim 14, wherein the flame retardant comprises a decabromodiphenyl ether and the synergist comprises antimony trioxide.

\* \* \* \* \*